United States Patent [19]

Staley

[11] 4,088,972

[45] May 9, 1978

[54] ELECTRICAL CIRCUIT ARRANGEMENT FOR FILTERING MOTOR BRUSH NOISE

[75] Inventor: James G. Staley, Batavia, N.Y.

[73] Assignee: GTE Sylvania Incorporated, Stamford, Conn.

[21] Appl. No.: 787,936

[22] Filed: Apr. 15, 1977

[51] Int. Cl.² .............................................. H02P 1/00
[52] U.S. Cl. .................................................. 318/532
[58] Field of Search ...................... 318/558, 521, 532; 360/73, 90; 226/178, 252

[56] References Cited

PUBLICATIONS

Technician Information sheet; GTE Sylvania; Chassis 02-40190-4 No. 05-24866-2.

*Primary Examiner*—Herman J. Hohauser
*Attorney, Agent, or Firm*—Norman J. O'Malley; Theodore D. Lindgren; Robert T. Orner

[57] ABSTRACT

An electrical circuit arrangement for filtering electrical brush noise transmitted from an open switching wire connected at one end to an intermittently used brush of a multi-speed electric motor driven by a power source and having an electrically grounded housing and stator, said circuit arrangement utilizing a switching transistor located in close proximity to said brush and motor.

5 Claims, 3 Drawing Figures

ELECTRICAL CIRCUIT ARRANGEMENT FOR FILTERING MOTOR BRUSH NOISE

BACKGROUND OF THE INVENTION

This invention relates to a switching-transistor noise filter which eliminates objectionable electrical noise pulses from being transmitted from an open switching wire attached to an intermittently used brush of a multi-speed, brush-type electric motor. In particular, transmission of electrical brush noise from wires which are electrically activated only during certain modes of motor operation, such as a high-speed mode, is minimized over a major portion of the electrical frequency broadcast system.

Brush-type electrical motors with multiple-speed brush connections are commonly used to drive tape recording apparatus. Such motors commonly have at least one intermittently energized brush with a conductive switching wire connected thereto. During operation of said motor in the fast-forward or high speed mode, for example, current is caused to flow through said switching wire and the fast-forward brush connected thereto by activation of a mechanical switch commonly located on the control panel associated with the chassis on which the motor and tape deck are mounted. However, during those periods of time during which the fast-forward mechanical switch is not activated, the switching wire connected to the fast-forward brush of the motor and extending to said open switch acts as a transmitting antenna for voltages present in the moving commutator during normal speed operation. The voltages present in the moving commutator are chopped into pulse form by the intermittent contact with the fast forward brush. The voltage pulses constitute electrical brush noise and contain frequencies throughout the spectrum including the standard allocated frequencies used for AM and FM broadcast and reception.

A problem resulting from the described transmission of electrical brush noise is particularly apparent during operation of a tape recorder for the purpose of recording and replaying signals transmitted by AM or FM commercial broadcasting stations. The electrical brush noise transmitted from the above-described switching wire is received and recorded along with the signal received and recorded from one of said broadcasting stations.

The method used to prevent transmission and therefore undesired reception of such brush noise has heretofore been through use of low-pass, inductance-capacitance filters. Capacitance filtering alone has been found insufficient to prevent the relatively low-frequency AM band frequencies of brush noise from reaching the open lead. Resistance-capacitance filtering is not feasible because of the adverse effect on the voltage-speed characteristic of the motor. In addition, existing LC filter design requires, for proper operation, an energy absorbing output load of given impedance rather than the open-circuited switching wire comprising the load in this case. Furthermore, the magnetic fields surrounding inductors used in such filters tend to cause additional transmission of undesired electrical brush noise, resulting in a counter-productive solution to the problem.

SUMMARY OF THE INVENTION

The filtering circuit arrangement described and claimed in this invention prevents the foregoing described transmission of electrical brush noise by use of a switching transistor located in close proximity to the point at which the fast-forward switching wire emanates from the motor housing. The transistor is biased at cut-off during the times during which the fast-forward mode of operation is not in use. During operation in the fast-forward mode the transistor is driven to saturation by a switching signal received from the previously described switch located on the control panel. However, during operation in the recording mode, electrical brush noise is effectively attenuated by the switching transistor and is not transmitted through and from the wire leading to the control panel switch and therefore electrical brush noise is not received at the receiver antenna.

DESCRIPTION OF THE PREFERRED EMBODIMENTS

The objects, advantages and capabilities of the present invention are further described herein with reference to the appended claims in connection with the above-described drawings.

Figure 1:
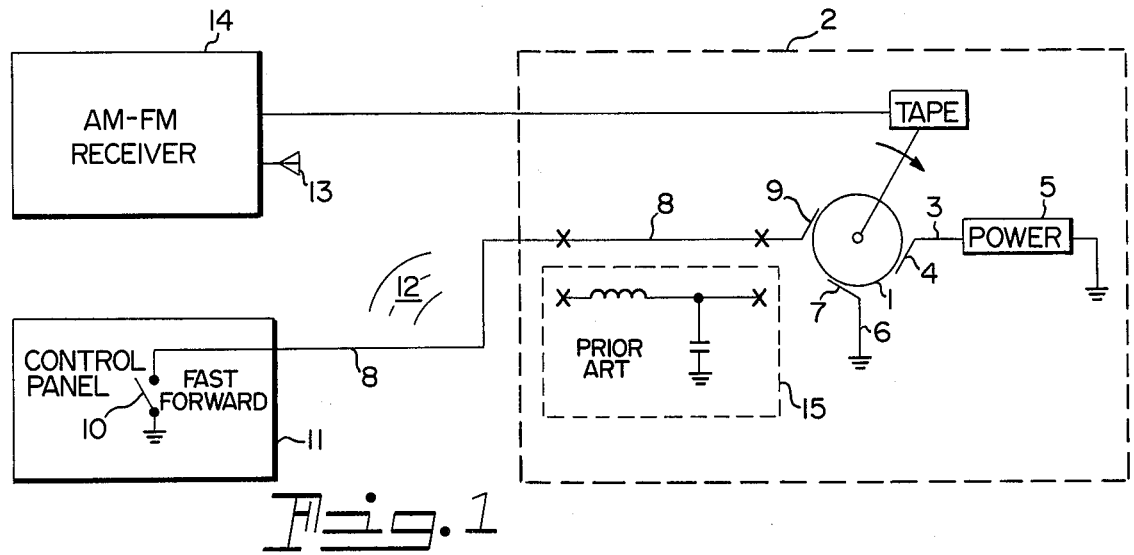
FIG. 1 indicates the circuit elements necessary for explanation of the noise transmission and also indicates a prior art filtering method used to prevent electrical brush noise signals from reaching the wire leading to the fast-forward switch used to control speed of a tape-recorder drive motor.

In FIG. 1 a two-speed motor 1 mounted on a tape recorder chassis 2 has a lead 3 coupling a motor brush 4 to an electrical power source 5, which in the example illustrated may be a source of direct current voltages with more than one value of output voltage. Lead 6 couples motor brush 7 to ground. During "record" and "play" modes of operation, leads 3 and 6 furnish electrical current for operation of motor 1. Switching wire 8 is coupled to a third brush 9 which, when coupled to ground through switch 10, causes the motor to operate in the "fast forward" mode. Switch 10 is located on a part of control panel 11.

When operating in "record" mode, switch 10 is open. As the energized windings of motor 1 contact brush 9, switching wire 8 is also energized from the point of contact at brush 9 to its contact located on switch 10. The voltage pulses, or electrical brush noise, applied to switching wire 8 include frequencies in the allocated AM and FM parts of the broadcast frequency spectrum. These frequencies, along with other frequencies, are transmitted in the form of electromagnetic field energy 12 from switching wire 8 to antenna 13 of receiver 14. The electrical brush noise frequencies which appear in that part of the spectrum of any broadcast station being recorded are therefore recorded along with the desired music or other signal information. In addition, electrical brush noise may be transmitted from switching wire 8 to the intermediate and audio frequency circuits of said receiver 14, and also result in undesired noise being recorded.

Previous attempts to eliminate transmission of electrical brush noise have included various combinations of inductors and capacitors such as those comprising filter 15 of FIG. 1. Any inductors used in filter 15 tend to act as transmitters of the undesired electrical brush noise. Filtering circuits using passive components have not been successful in eliminating transmission of electrical brush noise because of design limitations caused by the dual requirements of small direct-current resistance between input and output and of an open-circuited output. The filtering problem is of particularly difficult nature in the lower end of the frequency spectrum, such as in the standard AM broadcast band.

Figure 2:
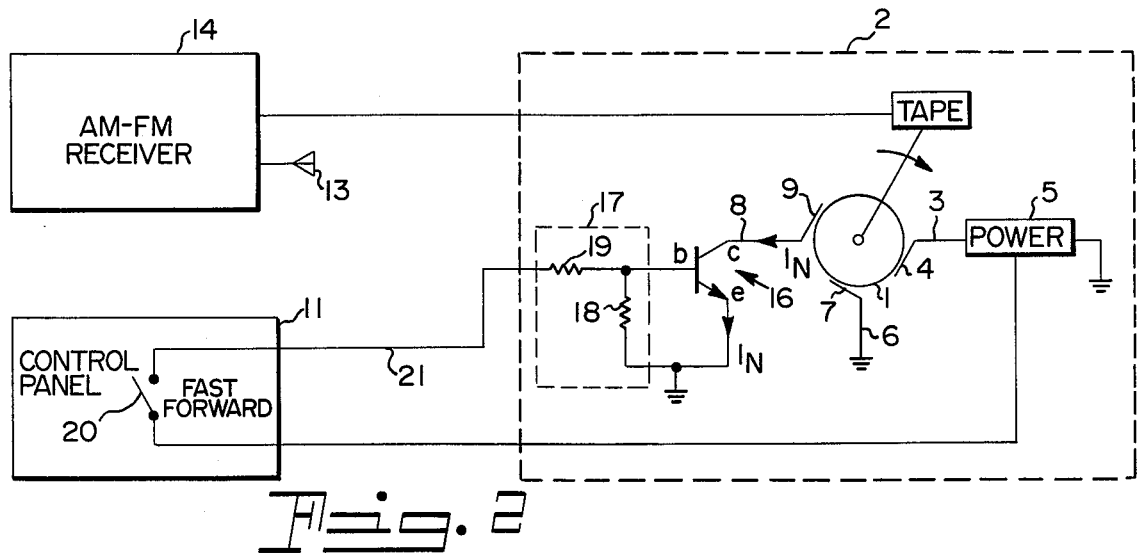
FIG. 2 indicates use of a switching transistor and associated bias circuitry to replace the prior art filter used in FIG. 1.

The filtering problem described above is uniquely solved by a circuit arrangement which includes mechanical placement of a switching transistor 16 in close proximity to brush 9, with collector and emitter connected as indicated in FIG. 2. Switching transistor 16 may be of the NPN or PNP type dependent upon whether a positive or negative direct current source of power drives the motor. The collector is coupled to brush 9 by switching wire 8 at a point in close proximity to that point at which wire 8 exits from the housing of motor 1. In certain applications, transistor 16 may be located inside the housing of motor 1 and may be connected directly to brush 9. Wire 8 must, of course, terminate in close proximity to the point of connection with the collector of transistor 16. The emitter of transistor 16 is connected by reasonably direct route to electrical ground in close proximity to transistor 16. Electrical ground may be the motor housing and stator. The base of transistor 16 is connected to biasing means 17 which may consist of a first biasing resistor 18 and a second biasing resistor 19. One terminal of first biasing resistor 18 is connected to said base and the other terminal of biasing resistor 18 is connected to electrical ground.

One terminal of second biasing resistor 19 is also electrically connected to the base of transistor 16. The other terminal of resistor 19 is electrically connected to remote switch control means 20 located on control panel 11. The electrical connection is indicated by second switching wire 21 in the circuit of FIG. 2. It will be apparent that biasing means 17 need not be located adjacent to transistor 16. Remote switch control means 20 may be comprised of a panel switch which is electrically connected to a source of direct current voltage, which must be of the same polarity and may or may not be the same source and same voltage as that of power source 5.

Switching transistor 16 is in "off" state when switching means 20 provides no signal and is driven to saturation when switching means 20 provides a signal of proper polarity. Typical values of resistors 18 and 19 are 56 ohms and 680 ohms respectively when used with a switching power source of 10 volts.

Figure 3:
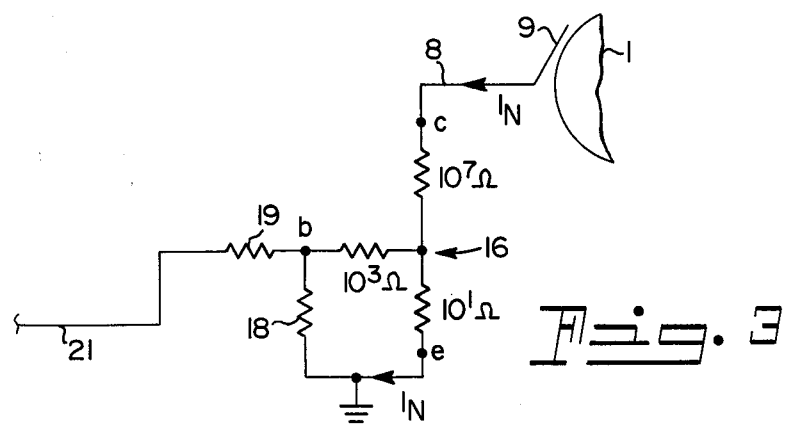
FIG. 3 indicates, for explanation purposes, an equivalent circuit for the switching transistor illustrated in FIG. 2.

The circuit of FIG. 3 indicates a direct current equivalent circuit illustrating the state of the circuit while transistor 16 is in "off" state. The impedance of the collector equivalent circuit of a typical transistor is typically on the order of $10^7$ ohms. The impedance of the emitter equivalent circuit is typically on the order of $10^1$ ohms while the impedance of the base equivalent circuit may be on the order of $10^3$ ohms. It is apparent from FIG. 3 that essentially all of the brush noise current, $I_N$, flows through the collector and emitter to ground. Using the familiar voltage division equation for series resistors, the noise voltage transmitted from the base of the transistor is on the order of $10^{-6}$ times the noise voltage input at the collector. Therefore, the brush noise voltage transmitted to switching wire 18 in FIGS. 2 and 3 is approximately $10^{-6}$ times that transmitted to switching wire 8 of FIG. 1.

It is understood that the embodiment shown is illustrative only, and that many variations, modifications and other noise filter applications may be made without departing from the principles of the invention herein described and defined by the appended claims.

What I claim is:

1. A circuit arrangement for filtering electrical brush noise transmitted from a switching wire connected at one end to an intermittently used brush of a multi-speed electric motor driven by a power source and having an electrically grounded housing and stator comprising:
   1. a switching transistor located in close proximity to said electric motor;
   b. the collector of said transistor connected to said switching wire at a point on said switching wire in close proximity to said brush;
   c. said switching wire terminating at a point in close proximity to said connection with said collector;
   d. the emitter of said transistor connected by reasonably direct route to electrical ground at a point in close proximity to said transistor;
   e. the base of said transistor electrically connected to a biasing means; and
   f. said biasing means and said transistor electrically connected to a remote switch control means.

2. The circuit arrangement of claim 1 in which said switching transistor is located in the interior of said motor housing.

3. The circuit arrangement of claim 1 in which the collector of said switching transistor is connected directly to said brush.

4. The circuit arrangement of claim 1 in which the emitter of said transistor is connected to said motor housing and stator.

5. The circuit arrangement of claim 1 in which said biasing means and said remote switch control means are comprised of a first biasing resistor with one terminal electrically connected to the base of said transistor and with second terminal electrically connected to ground, a second biasing transistor with one terminal electrically connected to said base and with second terminal electrically connected to one terminal of a panel switch, the other terminal of said panel switch electrically connected to a source of direct current voltage.

* * * * *